US008385473B2

(12) United States Patent
Liu et al.

(10) Patent No.: US 8,385,473 B2
(45) Date of Patent: Feb. 26, 2013

(54) APPARATUS AND METHOD FOR CLASSIFYING MODULATIONS IN MULTIPATH ENVIRONMENTS

(75) Inventors: Peng Liu, Beijing (CN); Li Zou, Shanghai (CN)

(73) Assignee: Thomson Licensing, Boulogne-Billancourt (FR)

( * ) Notice: Subject to any disclaimer, the term of this patent is extended or adjusted under 35 U.S.C. 154(b) by 625 days.

(21) Appl. No.: 12/450,215

(22) PCT Filed: Mar. 16, 2007

(86) PCT No.: PCT/CN2007/000850
§ 371 (c)(1),
(2), (4) Date: Sep. 16, 2009

(87) PCT Pub. No.: WO2008/113202
PCT Pub. Date: Sep. 25, 2008

(65) Prior Publication Data
US 2010/0098193 A1    Apr. 22, 2010

(51) Int. Cl.
*H04L 27/00* (2006.01)
(52) U.S. Cl. .................. 375/324; 375/322; 375/316
(58) Field of Classification Search .................. 375/324, 375/322, 316
See application file for complete search history.

(56) References Cited

U.S. PATENT DOCUMENTS

| 6,522,691 | B1 | 2/2003 | Williamson et al. |
| 6,614,851 | B1 | 9/2003 | Dehghan et al. |
| 6,690,746 | B1 | 2/2004 | Sills et al. |
| 2004/0189525 | A1 | 9/2004 | Beadle et al. |
| 2006/0094468 | A1* | 5/2006 | Hoshino et al. ............... 455/561 |
| 2006/0115013 | A1 | 6/2006 | Kim et al. |
| 2006/0189295 | A1 | 8/2006 | Adachi |
| 2006/0234729 | A1* | 10/2006 | Murakami et al. ............ 455/462 |

FOREIGN PATENT DOCUMENTS

| CN | 1798280 | 7/2006 |
| CN | 1825839 A | 8/2006 |
| CN | 1925476 | 3/2007 |
| EP | 0984595 | 4/2007 |
| JP | 06132860 | 5/1994 |
| JP | 2005-136773 | 5/2005 |
| JP | 2006521756 | 9/2006 |

(Continued)

OTHER PUBLICATIONS

Ananthram Swami et al.: "Hierarchical Digital Modulation Classification Using Cumulants" IEEE Transactions on Communications, IEEE Service Center, Piscataway, NJ, US vol. 48, No. 3, Mar. 1, 2000, pp. 416-429.

(Continued)

*Primary Examiner* — Kenneth Lam
*Assistant Examiner* — Michael Neff
(74) *Attorney, Agent, or Firm* — Robert D. Shedd; Joseph J. Opalach (57) ABSTRACT

A receiver supports a single carrier (SC) form of modulation and a multi-carrier form of modulation such as orthogonal frequency division multiplexing (OFDM). Upon receiving a signal, the receiver determines a maximum fluctuation range (MFR) as a function of at least a fourth-order cumulant of a received signal; and classifies a modulation type of the received signal as a function of the determined maximum fluctuation range. After determining the modulation type of the received signal, the receiver switches to that modulation mode to recover data from the received signal.

18 Claims, 10 Drawing Sheets

FOREIGN PATENT DOCUMENTS

JP          2007336078          12/2007

OTHER PUBLICATIONS

Soliman S. S. et al.: "Signal Classification Using Statistical Moments" IEEE Transactions on Communications, IEEE Service Center, Psicataway, NJ, US, vol. 40, No. 5, May 1, 1992, pp. 908-916.

Xiang Feng et al "Research on modulation identification algorithm for adaptive OFDM systems", Systems Engineering and Electronics Aug. 2005, vol. 27, No. 8, pp. 1325-1328.

Sharath B. Reddy et al. "An Efficient Blind Modulation Detection Algorithm for Adaptive OFDM Systems", 2003 IEEE Depart. of Electrical Engineering, University of South Florida, pp. 1895-1899.

Tevfik Yucek et al. "A Novel Sub-optimum Maximum-Likelihood Modulaton Classification Algorithm for Adaptive OFDM Systems", IEEE Communications Society 2004, Dept. of Electrical Engineering, University of South Florida, pp. 739-744.

S. Chatterjee et al. "Blind Estimation of Channel and Modulation Scheme in Adaptive Modulation Schemes for OFDM-CDMA Based 4G Systems", 2004 IEEE, pp. 1065-1075.

Jouko Leinonen et al. "Modulation Classification in Adaptive OFDM Systems", 2004 IEEE, University of Oulu, Centre for Wireless Communications, pp. 1554-1558.

Gang Han et al. "Study of blind detection techniques in adaptive OFDM", Journal of Xidian University, Aug. 2006, vol. 33, No. 4, pp. 602-606.

Search Report Dated Dec. 3, 2007.

* cited by examiner

APPARATUS AND METHOD FOR CLASSIFYING MODULATIONS IN MULTIPATH ENVIRONMENTS

This application claims the benefit, under 35 U.S.C. §365 of International Application PCT/CN2007/000850, filed Mar. 16, 2007, which was published in accordance with PCT Article 21(2) on Sep. 25, 2008 in English.

BACKGROUND OF THE INVENTION

The present invention generally relates to communications systems and, more particularly, to wireless systems, e.g., terrestrial broadcast, cellular, Wireless-Fidelity (Wi-Fi), satellite, etc.

Today, the number of communication signals being broadcast is on the rise. In addition, these broadcast communication signals may use different types of modulation. One form of receiver that supports multiple modulation types is represented by the currently proposed Chinese Digital Television System (GB) 20600-2006 that specifies a receiver support a single carrier (SC) modulation mode and a orthogonal frequency division multiplexing (OFDM) modulation mode. This receiver determines the type of modulation in the received signal by setting itself to each type of modulation until the receiver correctly recovers data in the received signal. For example, the receiver may first configure itself to receive an OFDM signal, and then test for the presence of predefined data in the received signal. If this test succeeds, the receiver assumes that the received signal is an OFDM signal. However, if this test should fail, then the receiver configures itself to receive a single carrier signal and then, again, tests for the presence of the predefined data in the received signal. Unfortunately, the presence of multipath effects may make it difficult for the receiver to locate the predefined data—whatever modulation type the receiver is set to. As a result, the receiver may take a long time to correctly determine the modulation type since the receiver will continue to switch back and forth between modulation types searching for the predefined data.

SUMMARY OF THE INVENTION

In a communications environment that supports different types of modulation, it would be beneficial if a receiver could adapt to any received signal to correctly recover the information conveyed therein whatever the modulation type without having to test for the presence of predefined data—even in a multi-path environment. Therefore, and in accordance with the principles of the invention, a receiver determines a fluctuation range (MFR) as a function of at least a fourth-order cumulant of a received signal; and classifies a modulation type of the received signal as a function of the determined fluctuation range.

In an embodiment of the invention, a receiver supports a single carrier (SC) form of modulation and a multi-carrier form of modulation such as orthogonal frequency division multiplexing (OFDM). Upon receiving a broadcast signal, the receiver downconverts the received broadcast signal to a received base-band signal. The receiver then determines a fourth-order cumulant and a second-order cumulant of the received base-band signal for use in calculating a normalized fourth-order cumulant of the received base-band signal. The receiver then measures a maximum fluctuation range (MFR) of the normalized fourth-order cumulant of the received base-band signal and classifies a modulation type of the received base-band signal as either SC or OFDM as a function of the measured maximum fluctuation range. After determining the modulation type of the received signal, the receiver switches to the classified modulation type, i.e., that modulation mode, to recover data from the received signal.

In view of the above, and as will be apparent from reading the detailed description, other embodiments and features are also possible and fall within the principles of the invention.

DETAILED DESCRIPTION

Other than the inventive concept, the elements shown in the figures are well known and will not be described in detail. For example, other than the inventive concept, familiarity with Discrete Multitone (DMT) transmission (also referred to as Orthogonal Frequency Division Multiplexing (OFDM) or Coded Orthogonal Frequency Division Multiplexing (COFDM)) is assumed and not described herein. Also, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC) and Chinese Digital Television System (GB) 20600-2006 is assumed. Likewise, other than the inventive concept, other transmission concepts such as eight-level vestigial sideband (8-VSB), Quadrature Amplitude Modulation (QAM), and receiver components such as a radio-frequency (RF) front-end, or receiver section, such as a low noise block, tuners, down converters and demodulators, correlators, leak integrators and squarers is assumed. Further, other than the inventive concept, familiarity with statistical processing of signals, such as forming cumulants, is assumed and not described herein. Similarly, other than the inventive concept, formatting and encoding methods (such as Moving Picture Expert Group (MPEG)-2 Systems Standard (ISO/IEC 13818-1)) for generating transport bit streams are well-known and not described herein. It should also be noted that the inventive concept may be implemented using conventional programming techniques, which, as such, will not be described herein. In this regard, the embodiments described herein may be implemented in the analog or digital domains. Further, those skilled in the art would recognize that some of the processing may involve complex signal paths as necessary. Finally, like-numbers on the figures represent similar elements.

Figure 1:
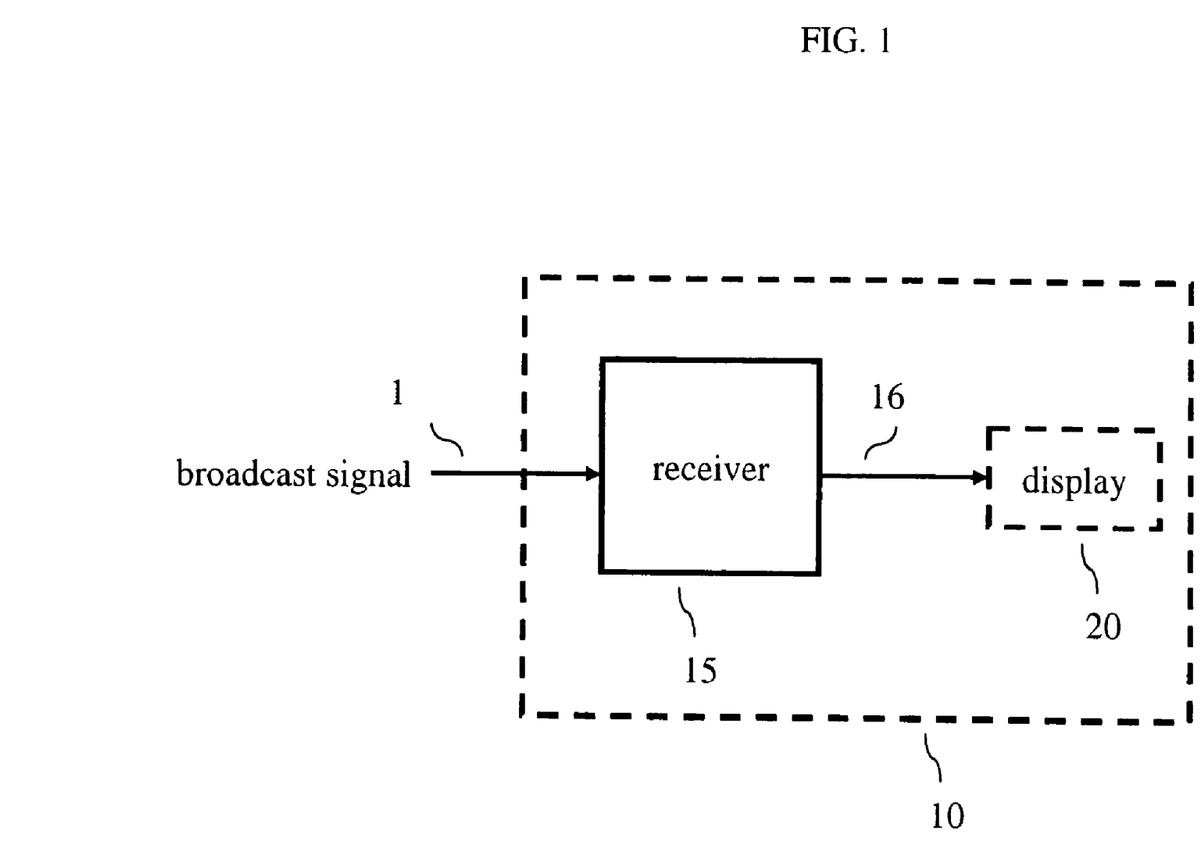
FIG. 1 shows an illustrative embodiment of an apparatus in accordance with the principles of the invention.

Referring now to FIG. 1, an illustrative embodiment of a device 10 in accordance with the principles of the invention is shown. Device 10 is representative of any processor-based platform, e.g., a PC, a server, a set-top box, a personal digital assistant (PDA), a cellular telephone, a mobile digital television (DTV), a DTV, etc. In this regard, device 10 includes one, or more, processors with associated memory (not shown) and also comprises receiver 15. The latter receives a broadcast signal 1 via an antenna (not shown)). For the purposes of this example, it is assumed that broadcast signal 1 is representative of a digital television (DTV) service, i.e., a DTV transport stream, which includes video, audio and/or system information for at least one TV channel and that broadcast signal 1 conveys this information using either a single carrier (SC) modulation or a multi-carrier modulation such as orthogonal frequency division multiplexing (OFDM). However, the inventive concept is not so limited and is applicable to any receiver that must select between at least two types of modulation. Since broadcast signal 1 can use at least two types of modulation, receiver 15 processes received broadcast signal 1 in accordance with the principles of the invention to determine the modulation type of received broadcast signal 1. Upon determining the modulation type of the received signal, receiver 15 further processes received broadcast signal 1 in accordance with the determined modulation type, e.g., by selecting an appropriate demodulation mode, etc., to recover therefrom output signal 16 for application to a output device 20, which may, or may not, be a part of device 10 as represented in dashed-line form. In the context of this example, output device 20 is a display that allows a user to view a selected TV program.

Figure 2:
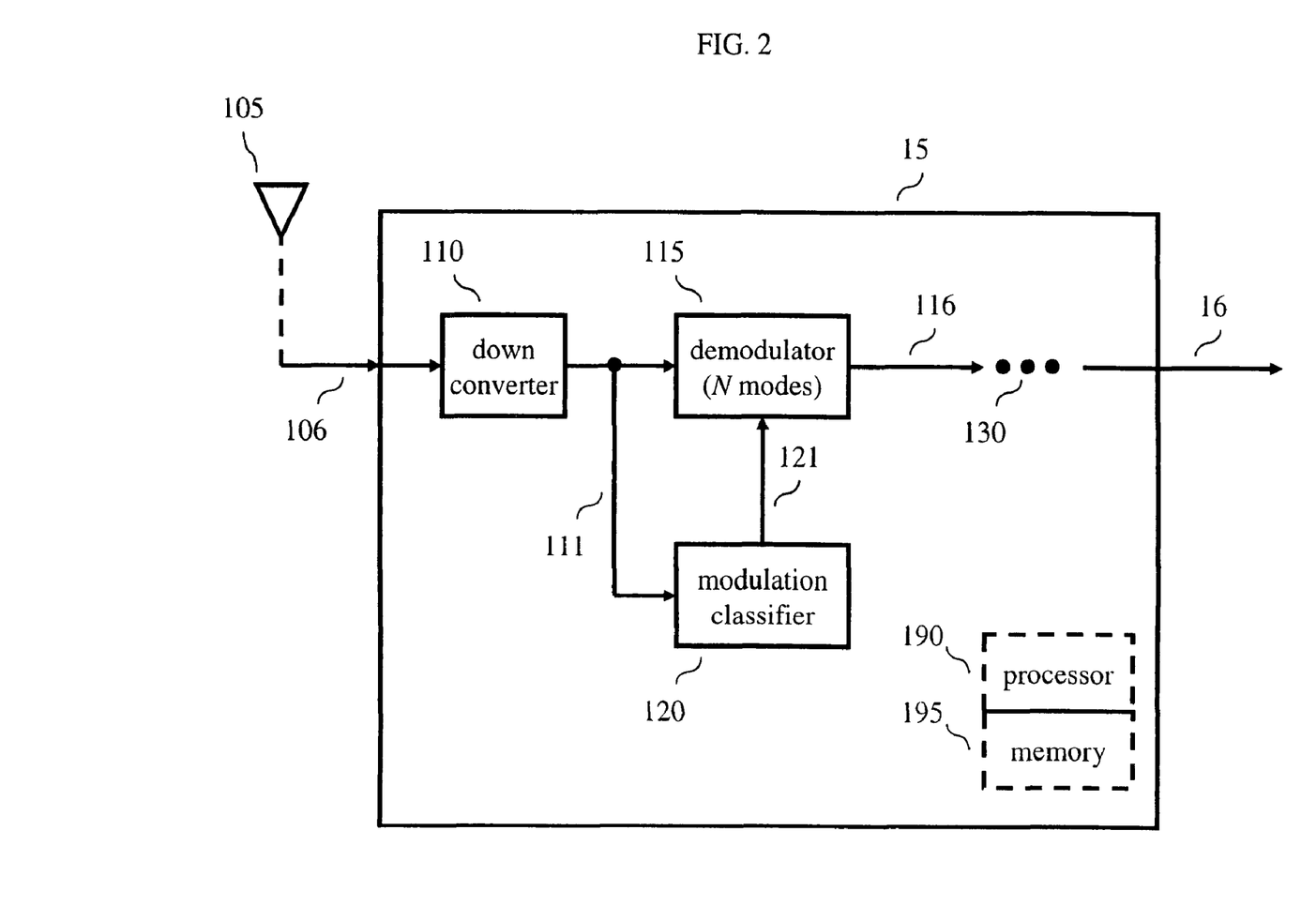
FIG. 2 shows an illustrative embodiment of a receiver in accordance with the principles of the invention.

Turning now to FIG. 2, an illustrative portion of receiver 15 is shown. Only that portion of receiver 15 relevant to the inventive concept is shown. Receiver 15 comprises down converter 110, demodulator 115, and modulation classifier 120. In addition, receiver 15 is a processor-based system and includes one, or more, processors and associated memory as represented by processor 190 and memory 195 shown in the form of dashed boxes in FIG. 2. In this context, computer programs, or software, are stored in memory 195 for execution by processor 190. The latter is representative of one, or more, stored-program control processors and these do not have to be dedicated to the receiver function, e.g., processor 190 may also control other functions of receiver 15. For example, if receiver 15 is a part of a larger device, processor 190 may control other functions of this device. Memory 195 is representative of any storage device, e.g., random-access memory (RAM), read-only memory (ROM), etc.; may be internal and/or external to receiver 15; and is volatile and/or non-volatile as necessary.

Antenna 105 of FIG. 2 receives one, or more, broadcast signals and provides them to receiver 15. In this example, antenna 105 provides received broadcast signal 106 to down converter 110. Down converter 110 is representative of the front-end processing of receiver 15 and includes, e.g., a tuner (not shown), etc., for tuning to and down converting received broad cast signal 106 to provide a base-band, or intermediate frequency (IF), received signal 111 for further processing by receiver 15. Received signal 111 is applied to demodulator 115 and modulation classifier 120. Demodulator 115 supports N modes of demodulation, where N>1. In the context of this example, N=2, where one demodulation mode is an OFDM mode and another demodulation mode is a SC mode. The demodulation mode used by demodulator 115 is controlled by modulation classifier 120, via control signal 121. In particular, modulation classifier 120 processes received signal 111 in accordance with the principles of the invention (described further below) to determine the type of modulation used by received signal 111 and then suitably sets demodulator 115 to the appropriate demodulation mode, via control signal 121. Once the demodulation mode is set, demodulator 115 demodulates received signal 111 to provided demodulated signal 116, which is then further processed by receiver 15 as known in the art (as represented by ellipses 130) to provide output signal 16. It should be noted that although demodulator 115 is represented as a single block, the invention is not so limited and there may be separate demodulators, each supporting one, or more, types of demodulation.

Figure 3:
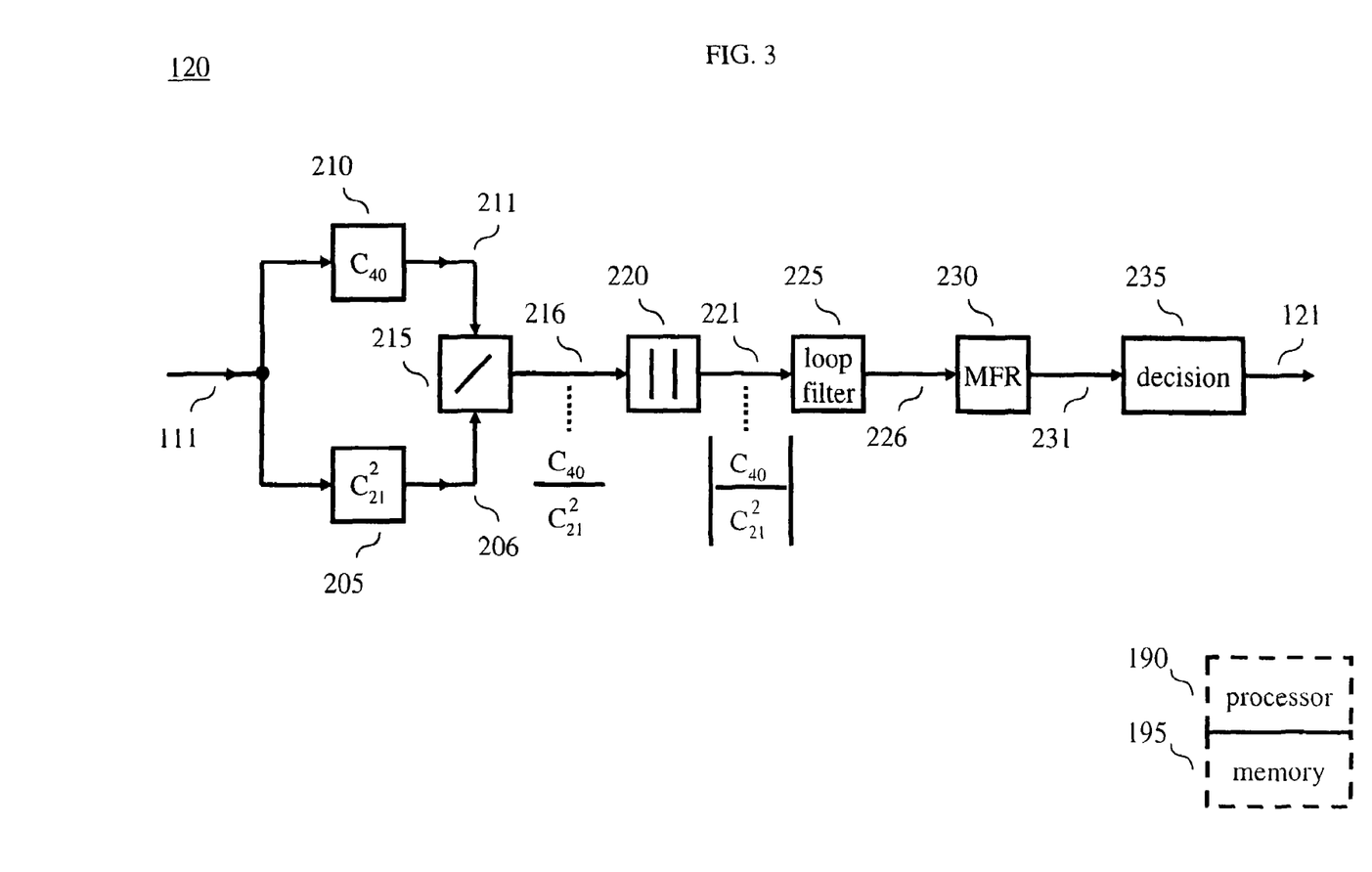
FIG. 3 shows an illustrative embodiment of a modulation classifier in accordance with the principles of the invention for use in the receiver of FIG. 2.

Before describing the inventive concept in detail, attention should now be directed to FIG. 3, which shows an illustrative embodiment of modulation classifier 120 in accordance with the principles of the invention. Modulation classifier 120 comprises elements 205, 210, 215, 220, loop filter 225, Maximum Fluctuation Range (MFR) element 230 and decision element 235. Received signal 111 is applied in parallel to elements 205 and 210. Element 205 forms a signal 206 representative of a second-order cumulant of received signal 111 for application to element 215. This second-order cumulant is referred to herein as $C_{21}^2$, where $C_{21}$ can be considered to be the average power of received signal 111. Element 210 forms a signal 211 representative of a fourth-order cumulant of received signal 111 for application to element 215. This fourth-order cumulant is referred to herein as $C_{40}$. Element 215 provides a signal 216, which is representative of the division of $C_{40}$ by $C_{21}^2$, i.e., $$\frac{C_{40}}{C_{21}^2}.$$

This is also referred to herein as the normalized fourth-order cumulant. Signal 216 is then applied to element 220, which provides a signal 221, which is representative of the magnitude of the normalized fourth-order cumulant, $$\left|\frac{C_{40}}{C_{21}^2}\right|.$$

Loop filter 225 filters the normalized fourth-order cumulant to remove high frequency components and provides a filtered signal 226 to MFR element 230.

Figure 4:
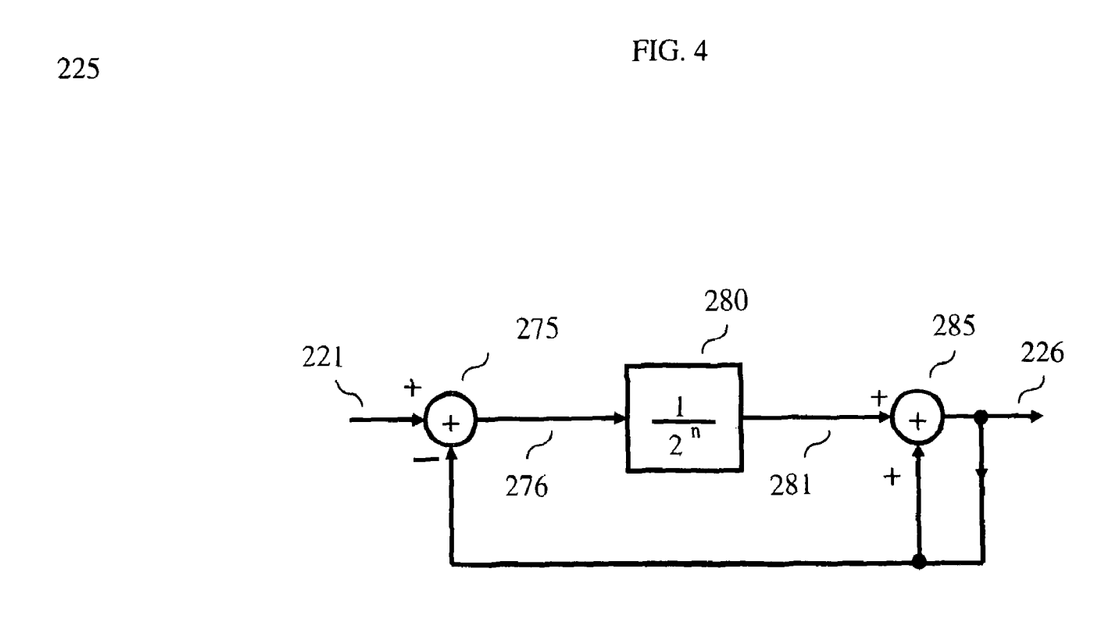
FIG. 4 shows an illustrative embodiment of a loop filter for use in the modulation classifier of FIG. 3.

Turning briefly to FIG. 4, an illustrative embodiment of loop filter 225 for providing filtered signal 226 is shown. Loop filter 225 is a first-order loop filter and comprises combiners 275 and 285, and filter 280. Signal 221 is applied to combiner 275, which forms a difference signal 276 that is representative of a difference between the magnitude of $$\left|\frac{C_{40}}{C_{21}^2}\right|$$

(signal 221) and filtered signal 226. Difference signal 276 is applied to filter 280, which filters difference signal 276 by $$\frac{1}{2^n}$$

to provide signal 281 to combiner 285. The latter adds signal 281 to filtered signal 226. In the loop filter, performance is decided mainly by the value for n. Although the value for n is determined experientially, some illustrative values may be n=8, or n=10.

Returning to FIG. 3, MFR element 230 processes the normalize fourth-order cumulant (provided via loop filter 225) to determine a maximum fluctuation range (MFR) of the normalized fourth-order cumulant. For example, MFR element 230 measures a maximum value of signal 226 and a minimum value of signal 226; and then determines the MFR by subtracting the minimum value from the maximum value. MFR element 230 provides the determined MFR to decision element 235, via signal 231. Decision element 235 then classifies the modulation type of received signal 111 as a function of the determined MFR. Illustratively, decision element 235 compares the determined MFR to a threshold value. If the determined MFR is greater than the threshold value, then decision element 235 classifies the modulation type as a SC modulation. However, if the determined MFR is less than, or equal to, the threshold value, then decision element 235 classifies the modulation type an OFDM type of modulation. Once the modulation type has been classified, decision element 235 provides control signal 121, which is representative of the determined type of modulation. As noted earlier, control signal 121 sets the appropriate demodulation mode of demodulator 115 of FIG. 2 in order to demodulate received signal 111.

Turning now in more detail to the inventive concept, for the purposes of this example received signal 111 is assumed to be a baseband signal received in a multipath environment. In this context, received signal 111, also referred to herein as r(n), is:

$$r(n) = \sum_{l=0}^{L-1} h_l(n)s(n - \tau_l) + w(n), \tag{1}$$

where $h_l(n)$ is the path complex gain for a particular path, l; $\tau_l$ is the path delay; L is the total number of paths; w(n) is additive which Gaussian noise (AWGN); and s(n) depends on the modulation type. In terms of s(n), the following signal models are used:

$$s_{PSK}(n) = \sqrt{P} \cdot e^{j\frac{2\pi i}{M}}; \tag{2}$$
where $i = 0, 1, \ldots, M - 1$;

$$s_{QAM}(n) = \sqrt{P} \cdot (a + jb); \tag{3}$$
where $a, b = 2i - M - 1$ and $i = 0, 1, \ldots, M - 1$;
and $$s_{OFDM}(n) = \sqrt{\frac{P}{H}} \sum_{h=0}^{H-1} c_h \cdot e^{j2\pi n \frac{h}{H}}; \tag{4}$$

where P is the power of signal for all three equations (2), (3) and (4). With respect to equations (2) and (3), these represent SC modulations and M is the level of SC modulation. In this example, equation (2) represents phase-shift keying (PSK) and equation (3) represents quadrature amplitude modulation (QAM). With respect to equation (4), this represents OFDM modulation, where H is the number of carriers (or subcarriers) in the OFDM signal, and $c_h$ is the symbol sequence, which is assumed to be centered, independent and identically distributed (I.I.D.).

As described above, and in accordance with the principles of the invention, a receiver performs modulation classification as a function of at least a fourth-order cumulant. In particular, the inventive concept takes advantage of the fact that in applying the Central-Limit Theorem it is known that OFDM probability converges on the Gaussian distribution and that SC modulations are known to be non-Gaussian distributions. As such, the fourth-order cumulants of Gaussian signals are zeros theoretically, which does not happen to non-Gaussian signals. Although the fourth-order cumulant itself could be used, multi-path effects may cause scale problems in data. As such, the fourth-order cumulant is normalized, e.g., with the square of the second-order cumulant, in order to alleviate any scaling problems. The normalized fourth-order cumulant is also referred to herein as $|\tilde{C}_{40}|$, where:

$$|\tilde{C}_{40}| = \left| \frac{C_{40}}{C_{21}^2} \right|. \tag{5}$$

In particular, $$|\tilde{C}_{40}(r(n))| = \left| \frac{C_{40}}{C_{21}^2} \right|, \text{ or} \tag{6a}$$

$$|\tilde{C}_{40}(r(n))| = \frac{\left| Cum_4\left( \sum_{l=0}^{L-1} h_l(n)s(n - \tau_l) + w(n) \right) \right|}{C_{21}^2}. \tag{6b}$$

where $$C_{40} = \left| Cum_4\left( \sum_{l=0}^{L-1} h_l(n)s(n - \tau_l) + w(n) \right) \right|$$

and Cum4 is the equation for a fourth-order cumulant. Therefore, equation (6b) can be rewritten as:

$$|\tilde{C}_{40}(r(n))| = \frac{\left| Cum_4\left( \sum_{l=0}^{L-1} h_l(n)s(n - \tau_l) \right) + Cum_4(w(n)) \right|}{C_{21}^2}. \tag{6c}$$

However, since, as noted above, the fourth-order cumulant of a Gaussian process is zero, equation (6c) can be further rewritten as:

$$|\tilde{C}_{40}(r(n))| = \frac{\left| Cum_4\left( \sum_{l=0}^{L-1} h_l(n)s(n - \tau_l) \right) \right|}{C_{21}^2}, \tag{6d}$$

or $$|\tilde{C}_{40}(r(n))| = \frac{\left| \sum_{l=0}^{L-1} Cum_4(h_l(n)s(n - \tau_l)) \right|}{C_{21}^2}. \tag{6e}$$

It should be noted that since $C_{21}$ is the average power, i.e., $C_{21} = E[|r(n)|^2]$, $C_{21}^2$ is a finite value. Similarly, the path gain $h_l(n)$ is also a finite value.

Now, the following observations are made. If the received signal is an OFDM signal, which is presumed to follow the Gaussian distribution, then, $$Cum_4(s(n-\tau_l)) \to 0. \tag{7}$$

However, since each path, $h_l(n)$, is a finite value, it can be deduced that:

$$Cum_4(h_l(n)s(n-\tau_l)) \to 0. \tag{8}$$

Therefore, $$\left|\sum_{l=0}^{L-1} Cum_4(h_l(n)s(n-\tau_l))\right| \to 0. \qquad (9)$$

Based on the above analysis, if the received signal is an OFDM signal then:

$$|\tilde{C}_{40}(r_{OFDM})| \to 0. \qquad (10)$$

In contrast to an OFDM signal, if the received signal is a SC signal, which is non-Gaussian, then $Cum_4(s(n-\tau_l))$ will be non-zero. As a result, $|\tilde{C}_{40}(r(n))|$ for an SC signal, i.e., $|\tilde{C}_{40}(r_{SC})|$, is non-zero and shows the channel properties. In other words, when a SC signal is transmitted in a multipath environment, each channel will have different amplitude properties, such that $|\tilde{C}_{40}(r_{SC})|$ will fluctuate over a large range. It should be noted that the obtained fourth-order cumulant may have many high frequency components, which will affect the estimation of the MFR. As such, it is advantageous, though not required, to use the earlier-described first-order loop filter to filter out these high frequency components and obtain an envelope of the fourth-order cumulant to improve the estimation performance.

Figure 5:
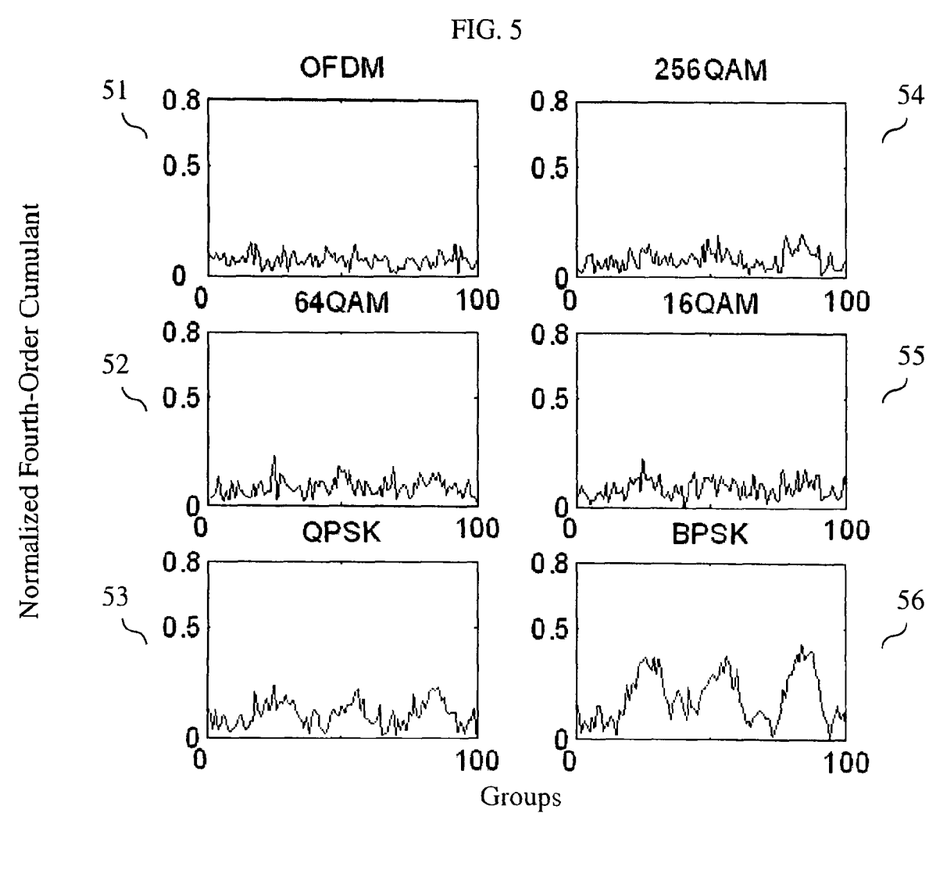
FIGS. 5-6 show illustrative graphs for use in understanding the inventive concept.
Figure 6:
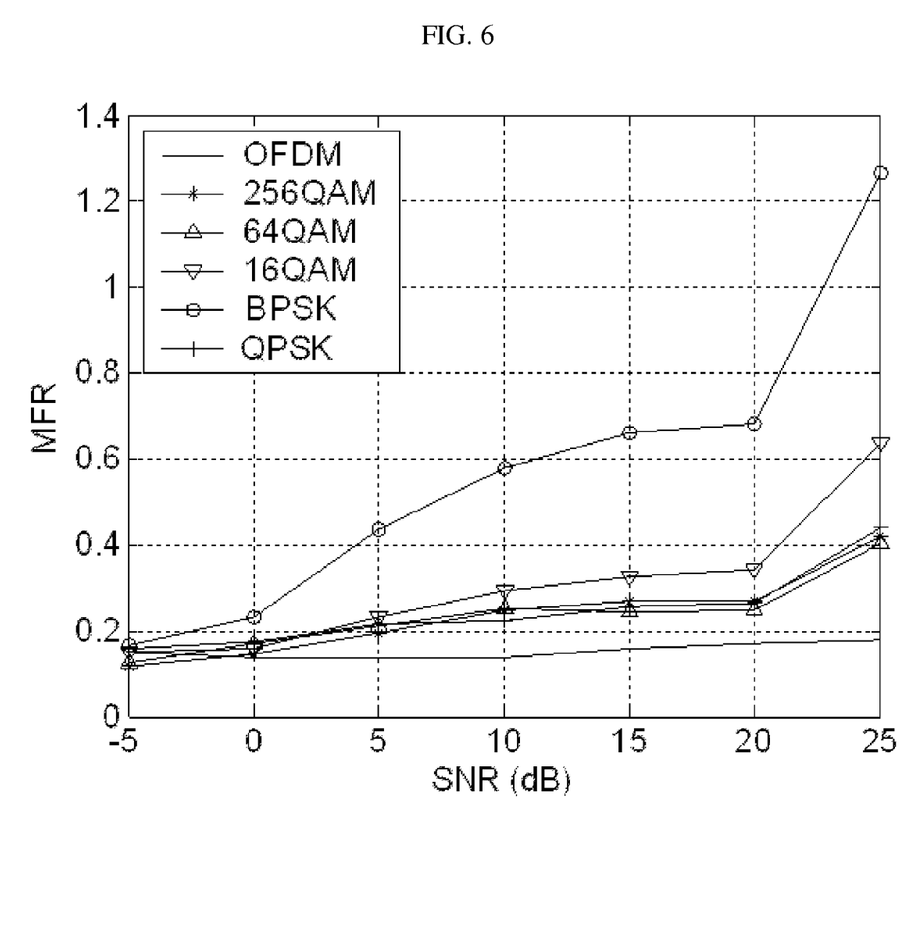

As a result of the above analysis, and in accordance with the principles of the invention, $|\tilde{C}_{40}|$ of the received signal is calculated and analyzed to determine if the received signal uses an OFDM modulation or an SC modulation. Reference should now be made to FIGS. 5-6, which further illustrate the inventive concept. FIG. 5 illustrates sample test results for an OFDM Digital Video Broadcasting-Terrestrial (DVB-T) signal with 2048 sub-carriers (2K mode) and SC modulations using 256 QAM, 64 QAM, 16 QAM, quadrature PSK (QPSK) and binary PSK (BPSK) modulation types. In this test, the channel model of portable reception $P_1$ in the known DVB-T standard is used, and the Doppler shift is 40 Hz. In particular, FIG. 5 illustrates the statistics of the fourth-order cumulant, $|\tilde{C}_{40}|$, for each modulation type at a signal-to-noise ratio (SNR) of 5 dB for 100 data groups, 5000 data samples in a group. It should be observed from FIG. 5 that the maximum fluctuation range (MFR) of $|\tilde{C}_{40}|$ is small in OFDM curve 51 and larger in SC curves 52, 53, 54, 55 and 56. This is further illustrated in FIG. 6, which shows a plot of the MFR for each type of modulation in a multi-path channel for 100 data groups, 5000 data samples in a group, across different SNRs. It can be observed from FIG. 6 that the MFR results for OFDM (curve 61) is well separated for the MFR curves for the other SC modulations. It should also be noted that since the cumulants are estimated, noise has a little influence on the results. Thus, and in accordance with the principles of the invention, OFDM and SC modulations can be classified in multi-path channels as a function of the MFR of $|\tilde{C}_{40}|$. In particular, a measured MFR of $|\tilde{C}_{40}|$ for a received signal is compared to a decision threshold (threshold) to decide between an OFDM modulation type and a SC modulation type. In particular, a receiver decides if a received signal is an OFDM type of signal if:

MFR≤threshold. (11a)

Otherwise, the receiver decides the received signal is a SC type of modulation, i.e.

MFR>threshold (11b)

Illustratively, a value for threshold is derived from the above-described MFR measurements, e.g., illustrated in FIG. 6. A usual approximation is to consider that the results are equal probability. In this case, the threshold is:

$$\text{threshold} = \frac{MFR_{OFDM} + \min(MFR_{SC})}{2}. \qquad (12)$$

The receiver can estimate the SNR to determine particular $MFR_{OFDM}$ and $MFR_{SC}$ values to use from FIG. 6. For example, data from FIG. 6 can be stored in a table (not shown) for use by the receiver in determining particular threshold values (equation (12)) at different estimated SNRs.

Figure 7:
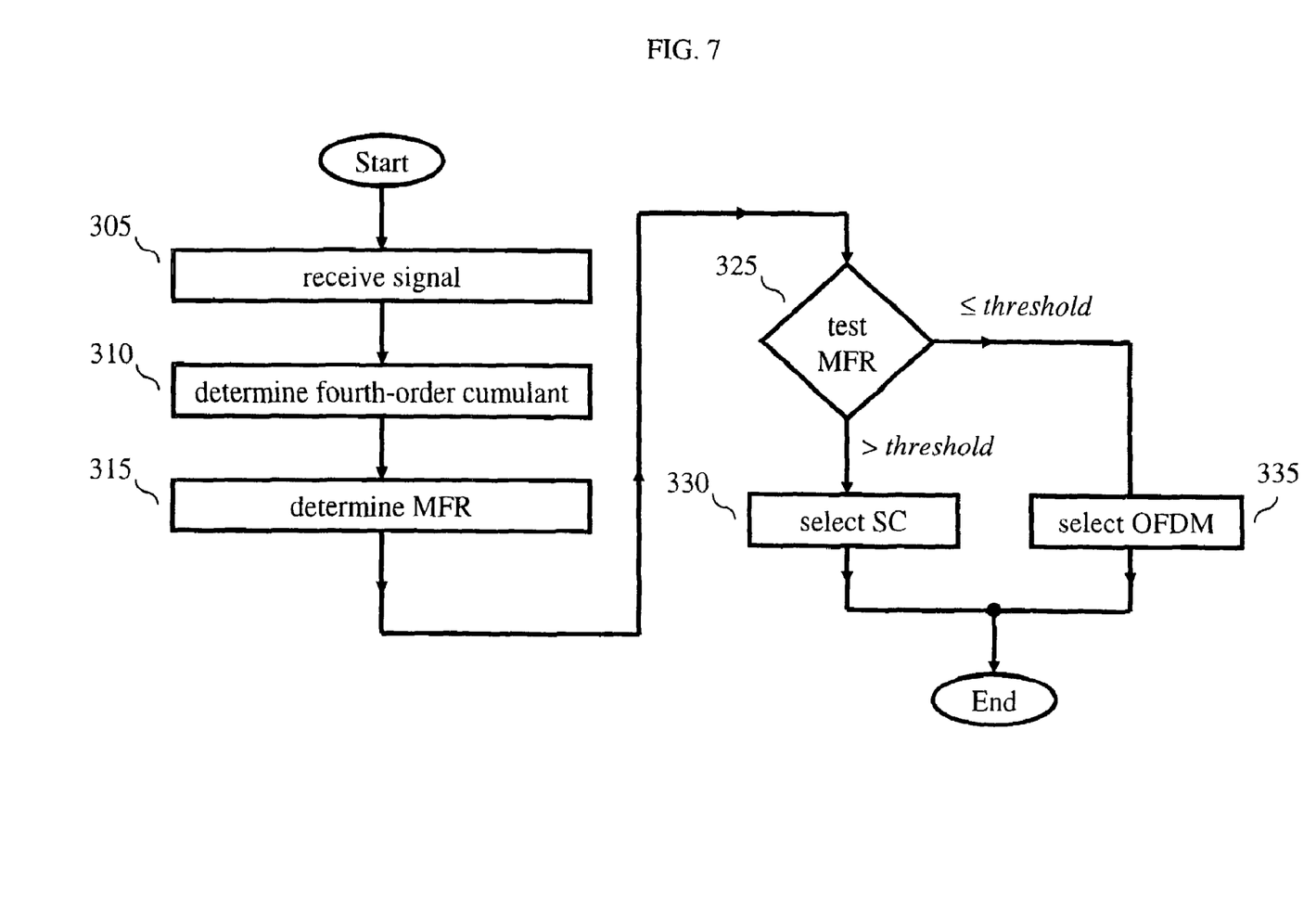
FIGS. 7-8 show illustrative flow charts for use in a receiver in accordance with the principles of the invention.
Figure 8:
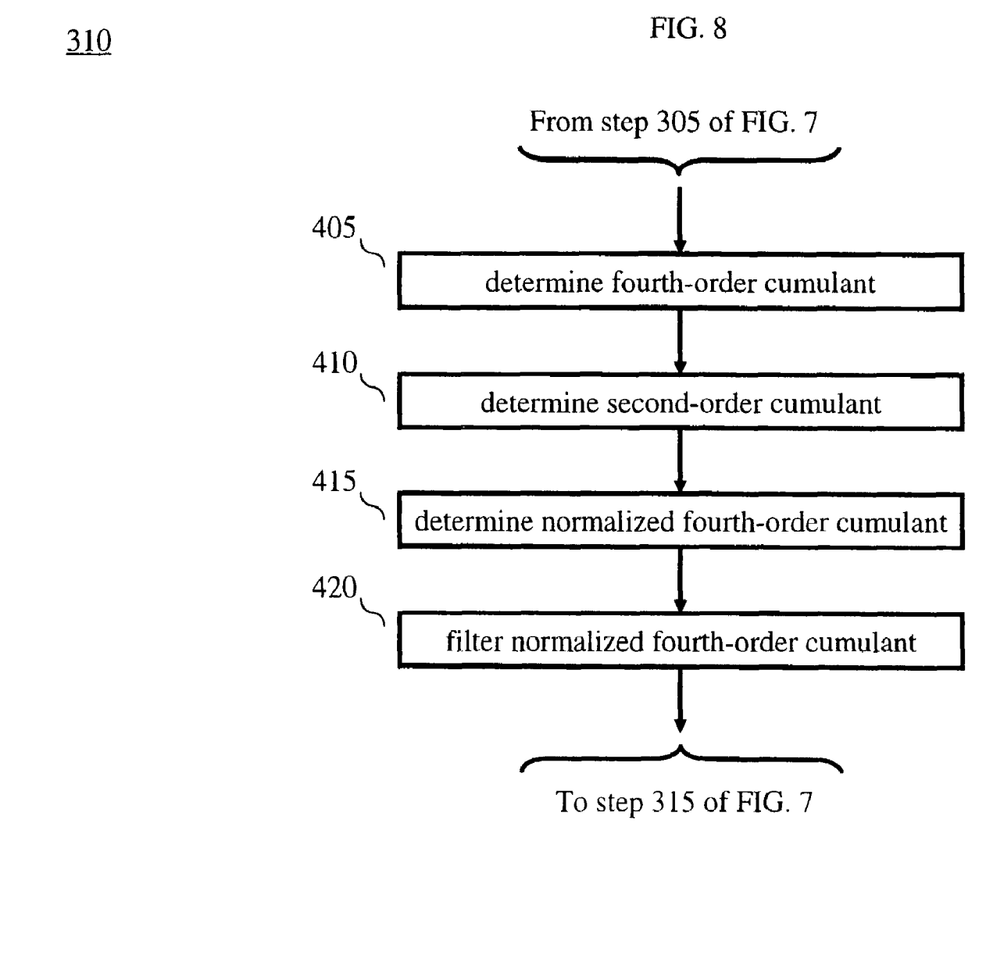

Referring now to FIG. 7, an illustrative flow chart for use in a receiver for performing modulation classification in accordance with the principles of the invention is shown. In step 305, a receiver receives a broadcast signal (e.g., receiver 15 of FIG. 3). In step 310, the receiver determines a fourth-order cumulant of the received signal (e.g., element 210 of FIG. 3). In addition, and as illustrated in FIG. 8, this step may include not only calculating a fourth-order cumulant of the received signal but also calculating a second-order cumulant of the received signal, normalizing the determined fourth-order cumulant and then filtering the normalized fourth-order cumulant as illustrated by steps 405, 410, 415 and 420 (also illustrated in FIG. 3 by elements 205, 215 220 and 225). In step 315, the receiver determines the MFR of the received signal as a function of the fourth-order cumulant. For example, in FIG. 3, MFR element 230 measures the MFR of the normalized fourth-order cumulant of the received signal. In step 325, the receiver compares the determined MFR to a threshold (e.g., decision element 235 of FIG. 3). If the determined MFR is less than, or equal to, the threshold, the receiver classifies the received signal as an OFDM type of modulation in step 335. On the other hand, if the determined MFR is greater than the threshold, the receiver classifies the received signal as a SC type of modulation in step 330.

Figure 9:
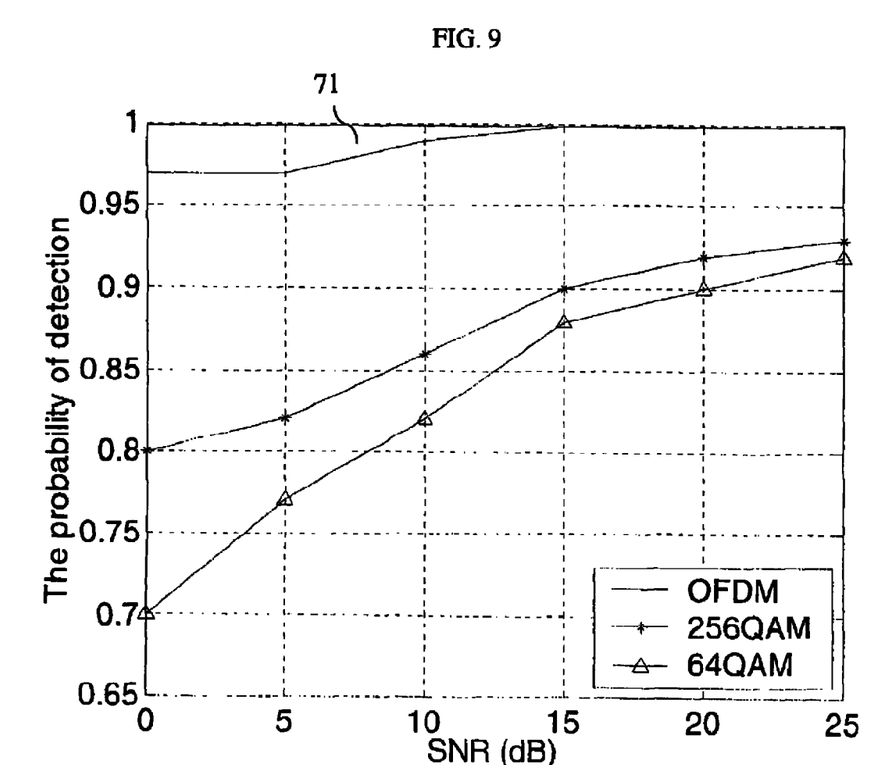
FIGS. 9-10 show illustrative test results.
Figure 10:
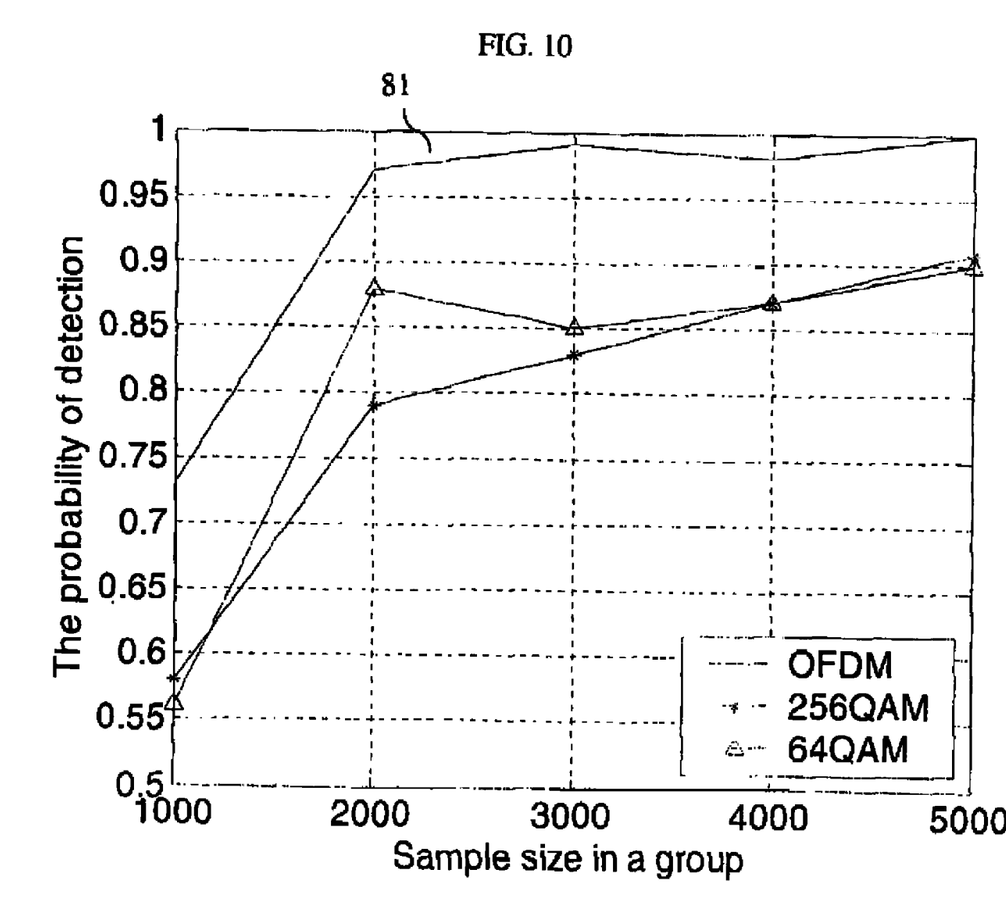

Illustrative performance results are shown in FIGS. 9 and 10 for when the modulation types are OFDM (2048 subcarriers), 256 QAM and 64 QAM, respectively. FIG. 9 shows the detection probability versus SNR, 100 trials, 100 data groups in a trial, 5000 data samples in a group. It should be observed that there is a good probability of detection. i.e., correctly classifying the received signal. For example, the probability for correctly detecting an modulation type of signal (curve 71) exceeds 90% at SNR=20 dB. Similarly. FIG. 10 shows the detection probability versus sample size in a group, SNR=20 dB, 100 trials, 100 data groups in a trial. In FIG. 10, the probability for correctly detecting an OFDM type of signal versus different sample sizes is illustrated by curve 81.

As described above, and in accordance with the principles of the invention, a receiver performs modulation classification in multipath environments and, as such, is able to adapt to the received signal by setting the modulation type. The inventive concept is also representative of a blind modulation classification method and apparatus since the receiver determines, or estimates, the modulation type without looking for predefined data in the received signal. It should be noted that although the inventive concept was illustrated in the context of a DTV broadcast signal, the inventive concept is not so limited and is applicable to other types of receivers that perform adaptive reception, such as a software defined radio receiver, etc.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, any or all of the elements may be implemented in a stored-program-controlled processor, e.g., a digital signal processor, which executes associated software, e.g., corresponding to one, or more, of the steps shown in, e.g., FIGS. 7-8, etc. Further, the principles of the invention are applicable to other types of communications systems, e.g., satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention as defined by the appended claims.

The invention claimed is:

1. A method for use in a receiver, the method comprising:
determining a maximum fluctuation range (MFR) from a normalized fourth-order cumulant of a received signal;
classifying a modulation type of the received signal as a function of the determined MFR; and
setting a demodulator to a corresponding one of at least two demodulation modes in accordance with the modulation type to process the received signal.

2. The method of claim 1, wherein at least one modulation type is a single carrier form of modulation and another modulation type is a multi-carrier form of modulation.

3. The method of claim 2, wherein the multi-carrier form of modulation is orthogonal frequency division multiplexing.

4. The method of claim 2, wherein the single carrier form of modulation is at least one of binary phase shift keying, quadrature phase shift keying, 16 quadrature amplitude modulation, 64 quadrature amplitude modulation and 256 quadrature amplitude modulation.

5. The method of claim 1, wherein the determining step includes the steps of:
determining a second-order cumulant of the received signal; and
determining the normalized fourth-order cumulant of the received signal from the second-order cumulant and the fourth-order cumulant.

6. The method of claim 1, wherein the determining step includes the step of:
filtering the normalized fourth-order cumulant of the received signal before determining the MFR.

7. The method of claim 1, wherein the determining step includes the step of:
downconverting the received signal to base-band before determining the MFR.

8. The method of claim 1, wherein the classifying step includes the steps of:
classifying the received signal as a multi-carrier form of modulation if the determined MFR is less than a threshold value; and
classifying the received signal as a single carrier form of modulation if the determined MFR is greater than a threshold value.

9. Apparatus comprising:
a demodulator for providing at least two demodulation modes for processing a received signal; and
a processor for determining a modulation type of the received signal from a normalized fourth-order cumulant of the received signal and for setting the demodulator to a corresponding one of the demodulation modes in accordance with the determined modulation type, wherein the processor operates to (a) determine a maximum fluctuation range (MFR) from the normalized fourth-order cumulant of the received signal, and (b) classify the modulation type of the received signal as a function of the determined MFR.

10. The apparatus of claim 9, further comprising:
a down converter for processing a received broadcast signal to provide the received signal.

11. The apparatus of claim 9, wherein the processor classifies the received signal as a multi-carrier form of modulation if the determined MFR is less than a threshold value; and classifies the received signal as a single carrier form of modulation if the determined MFR is greater than a threshold value.

12. The apparatus of claim 9, wherein the processor operates to (a) determine the fourth-order cumulant of the received signal, (b) determine a second-order cumulant of the received signal, and (c) determine the normalized fourth-order cumulant of the received signal from the second-order cumulant and the fourth-order cumulant.

13. The apparatus of claim 12, wherein the processor classifies the received signal as a multi-carrier form of modulation if the determined maximum fluctuation range is less than a threshold value; and classifies the received signal as a single carrier form of modulation if the determined maximum fluctuation range is greater than a threshold value.

14. The apparatus of claim 12, wherein the processor filters the normalized fourth-order cumulant of the received signal before determining the maximum fluctuation range.

15. The apparatus of claim 9, wherein at least one modulation type is a single carrier form of modulation and another modulation type is a multi-carrier form of modulation.

16. The apparatus of claim 15, wherein the multi-carrier form of modulation is orthogonal frequency division multiplexing.

17. The apparatus of claim 15, wherein the single carrier form of modulation is at least one of binary phase shift keying, quadrature phase shift keying, 16 quadrature amplitude modulation, 64 quadrature amplitude modulation and 256 quadrature amplitude modulation.

18. The apparatus of claim 9, wherein the processor classifies the received signal as a multi-carrier form of modulation if the determined MFR is less than a threshold value; and classifies the received signal as a single carrier form of modulation if the determined MFR is greater than a threshold value.

* * * * *